Dec. 15, 1970
F. J. ADAMS
3,546,957
VARIABLE RATIO STEERING GEAR
Filed April 15, 1969
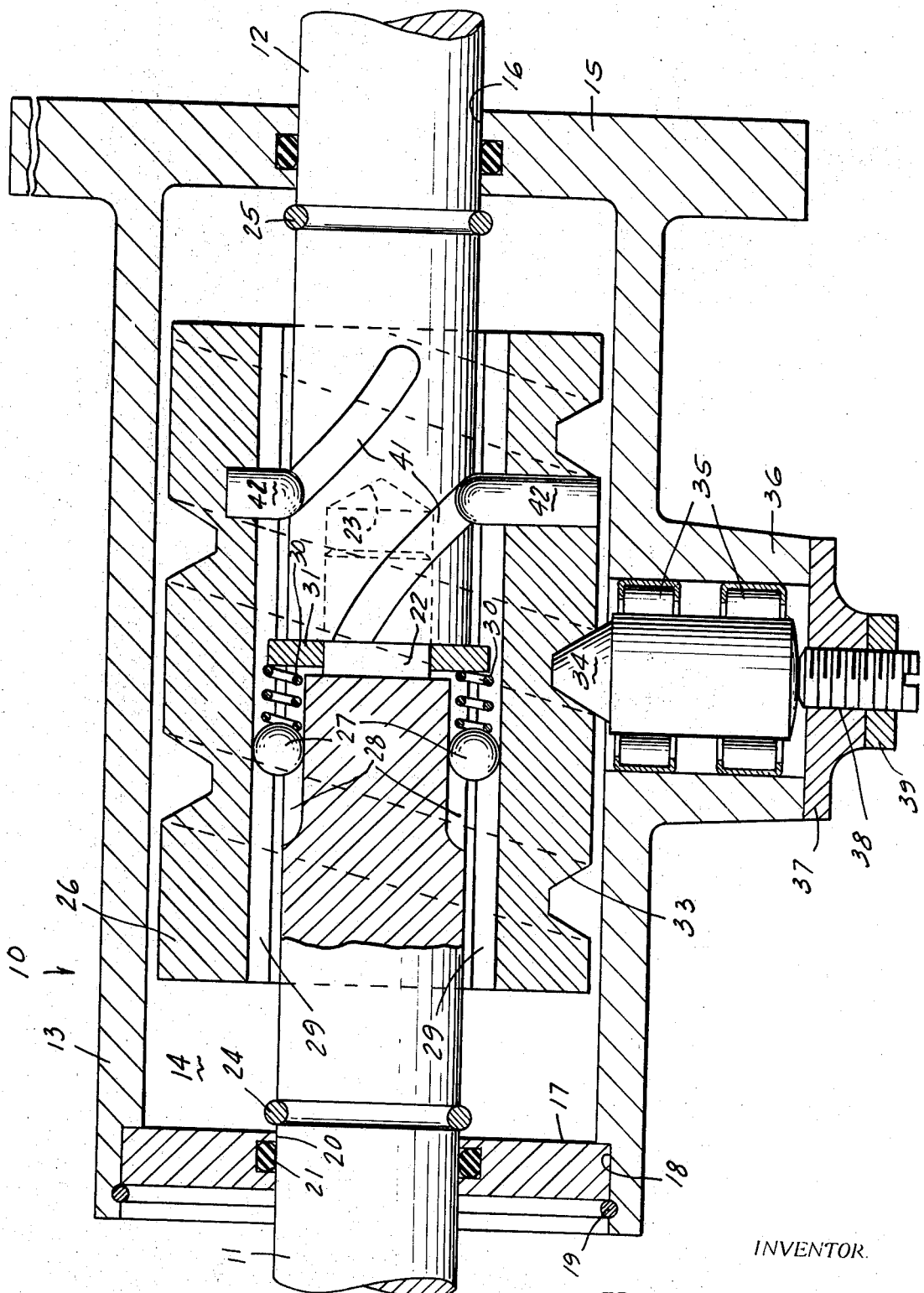
INVENTOR.
FREDERICK JOHN ADAMS
BY *Hill, Sherman, Meroni, Gross & Simpson* ATTORNEYS

United States Patent Office
3,546,957
Patented Dec. 15, 1970

1

3,546,957
VARIABLE RATIO STEERING GEAR
Frederick J. Adams, Campton, near Shefford, England, assignor, by mesne assignments, to Cam Gears, Ltd., Hitchin, Hertfordshire, England, a British company
Filed Apr. 15, 1969, Ser. No. 816,333
Claims priority, application Great Britain, Apr. 17, 1968, 18,087/68
Int. Cl. B62d 1/20
U.S. Cl. 74—497
10 Claims

ABSTRACT OF THE DISCLOSURE

A transmission coupling, especially suitable for steering gear, providing a desired ratio between input and output shafts through an axially shiftable sleeve rotated by the input shaft, having a helical groove and follower connection with a housing to translate rotation into axial movement and having a helical groove and follower connection with the output shaft to convert the axial movement into rotation of the output shaft. The followers are preferably of the pin type, the pitches of the helical grooves differ to provide a ratio of rotation between the shafts, and one helical groove preferably has a variable pitch to vary the ratio.

BACKGROUND OF THE INVENTION

Field of the invention

The present invention pertains to a transmission coupling for providing a ratio of rotation between an input and an output shaft particularly adapted for use in a steering mechanism for a vehicle having dirigible wheels.

Prior art

In a steering system for an automobile it is desirable to provide a ratio between the input shaft which is turned by the operator of the vehicle and the shaft which converts the rotational movement into linear movement for the steering linkage. An example of such a device is illustrated in the U.S. Pat. No. 923,583 dated June 1, 1909. By providing a ratio reduction in the rate of rotation for the output shaft occurs with a corresponding increase in the torque applied by the shaft to the steering linkage. With the advent of various power steering devices, such as power assist steering system, the requirement for torque in turning the wheels to a lock position while moving at slow speeds or during parking is supplied by the power assist device of the steering system. Thus, the ratio between the turning of the steering wheel by the operator and the turning of the shaft on which the pitman of the steering linkage is attached is not necessary for supplying the torque for turning the wheels to a locked position. However, if the ratio between the input and output shaft is decreased, the operator tends to oversteer the vehicle which may result in losing control while traveling at high speeds on relatively straight highway. Various devices have been suggested which will provide a change in the steering ratio dependent upon the amount of turning of the wheel by the operator. Such a device is illustrated in U.S. Pat. 1,567,997, dated Dec. 29, 1925.

SUMMARY OF THE INVENTION

The present invention provides a transmission device for obtaining a ratio between an input rotation and output rotation. The transmission device includes a sleeve disposed in a housing and telescopically overlapping an end of a shaft journalled for rotation in the housing, and means for rotating the sleeve in the housing. The transmission device includes means including a worm groove and follower disposed between the housing and sleeve to cause

2 the sleeve to move axially as it is rotated and means including a helical groove and follower disposed between the sleeve and shaft to transfer the rotation of the sleeve to the shaft at a ratio dependent on the pitch relationship of the helical grooves. In the preferred embodiment, one of the grooves has a varying pitch receiving a pin type follower to vary the ratio of rotation in response to the amount of the input rotation from a predetermined point.

Accordingly it is an object of the present invention to provide a tarnsmission means for obtaining a ratio between the input rotation and output rotation.

Another object of the present invention is to provide a transmission means providing a ratio between an input rotation and an output rotation which varies in response to the amount of rotation from a predetermined point.

Other objects and advantages of the invention will become apparent from the disclosure of the following specification and the appended drawing.

BRIEF DESCRIPTION OF THE DRAWINGS

The drawing is a cross-section with portions in elevation of a transmission device of the present invention.

DESCRIPTION OF THE PREFERRED EMBODIMENT

The principles of the present invention are particularly useful when embodied in a transmission means or device generally indicated at 10 for transferring rotational motion of an input shaft 11 to an output shaft 12. The transmission means 10 is useful when the input shaft and output shaft are rotated a limited number of revolutions. Therefore, the transmission means 10 is particularly adapted to be used as a transmission coupling in a steering system to provide a ratio between turns of the steering wheel and the rotation of the shaft which is connected to the steering linkage.

The transmission device 10 includes a housing 13 having a cavity 14 closed at one end by an integral end wall 15 which has an aperture 16 provided with a seal in which the output shaft 12 is journalled for rotation. The cavity 14 at the end opposite the wall 15, is provided with a removable end wall 17 held in a counterbore 18 by retaining means 19 which may be a snap ring. The end wall 17 is provided with an aperture 20 having seal means such as an O-ring 21 for rotatably journalling the input shaft 11 in coaxial alignment with the output shaft 12.

To in sure the axial alignment of the ends of the input shaft 11 and the output shaft 12, the two ends are loosely spigoted together by means of a reduced diameter portion 22 of the input shaft 11 being loosely received in a bore 23 of the output shaft 22. Each of the shafts 11 and 12 are provided with retainers 24 and 25 respectively to limit the axial movement of the shafts in the housing 13 until installation in a steering system.

To transfer rotational movement of the input shaft 11 to the output shaft 12, a sleeve member 26 overlapping the end of the shafts 11 and 12 is provided. The sleeve member has a length so that regardless of its axial movement within the cavity 14 a portion of the member still overlaps each of the ends of the shafts.

To transfer rotational movement of the input shaft 11 to the sleeve member 26, key means, which as illustrated include a pair of balls 27 each of which is partially engaged by and extends between the axial groove 28 of the input shaft 11 and an axial groove 29 of the sleeve member 26, are provided. To maintain the balls in approximately a center or midpoint position with respect to the overlapping portion of the shaft 11 and sleeve member 26, springs 30 are provided between the ball 27 and a washer 31 which is received on the reduced portion 22 of the shaft 11.

To cause axial movement of the sleeve member 26 with respect to the housing 13 and the ends of the shafts 11 and 12, a cam means including a helical or worm groove 33 and a follower 34 are provided between the housing 13 and the sleeve member 26. As illustrated, the helical groove 33 is provided on an outer surface of the sleeve member 26 and the follower 34 is a pin follower rotatably mounted in a pair of roller bearings 35, 35 disposed in a hollow boss 36 provided in the wall of the housing 13. A closure plate 37 is positioned on the boss 36 and has adjustment means for positioning the cam follower 34 in the groove 33 with adjustment means comprises a threaded member such as the set screw 38 threaded through the plate 37 and a lock nut 39.

To transfer rotation from the sleeve 26 to the output shaft 12, a second cam means comprising a pair of parallel helical grooves 41, 41 on the output shaft 12 and a pair of pin-type followers 42, 42 mounted on the inner surfce of the sleeve member 26 is provided. The amount of rotation of shaft 12 depends upon the difference in the pitch of the worm groove 33 and the pitch of the grooves 41. If both grooves have the same pitch, the sleeve member 26 will merely thread itself on the shaft 12 with no rotation being transferred therebetween. If the grooves 41 are axial grooves, the sleeve member 26 rotates the shaft 12 at the same speed or rate. As illustrated, the grooves 41 have a variable pitch which decreases symmetrically from a center point or position as the angular distance of the groove from the center position increases. Therefore, the differences in the pitch increases as the angle of rotation increases to provide a corresponding change in the ratio between the input and output rotational rates. Since the differences in the pitch increases, the ratio decreases toward a ratio of 1:1.

Since the transmission means 10 is being contemplated for use in a steering system, the variations in the pitch of the grooves 41 is symmetrical on each side of a center position which center position corresponds to the position of the parts of the transmission means 10 as the vehicle travels in a straight line. The rate of changing the pitch as the angular distance from the center position increases is dependent upon how rapidly the ratio between the input and output shafts is to be changed. Thus, transmission means 10 when used in a steering system provides a ratio between the rate of rotation applied by the driver and the rate of rotating the pitman which ratio is relatively high for slight amounts of rotation from the center position but decreases as the amount of rotation increases to move the wheels to a lock position.

In operation, a clockwise rotation of the input shaft 11 of the transmission means 10 rotates the sleeve member 26 in the same direction and in the same amount or to the same angle. When rotated, the sleeve member 26 is moved axially by the coaction of the worm groove 33 and the pin 34 and a clockwise rotation of the sleeve member 26 causes axial movement toward the end wall 15 of the housing 13. The pins 42 on the sleeve member 26 move in the respective grooves 41 and cause a clockwise rotation of the output shaft 12 at a rate which depends on the difference in the pitch of the worm grooves 33 and the helical groove 41. A counterclockwise rotation of the input shaft 11 in a similar manner produces a counterclockwise rotation of the output shaft 12 with the ratio between the rates or angles of rotation.

It should be noted that although the invention was illustrated and described with the worm groove 33 and the grooves 41 being provied in the sleeve members 26 and the shaft 12 respectively, the elements could be reversed. For example, the shaft 12 could have pin means to coact with grooves formed in the inner surface of the sleeve member 26. Furthermore, instead of varying the pitch of the grooves 41, 41, the same result could be obtained if the pitch of the grooves 33 are varied. Thus to obtain a decreasing ration, the pitch of the groove 33 should become progressively steeper as the distance from the center position increases.

In the above discussion it was assumed that the output shaft 12 was to rotate at a slower rate than the input shaft 11. If it is desirable to rotate the output shaft 12 at a faster rate than the input shaft 11, the faster rate of roation for the output shaft can be obtained by the proper selection of the pitch for the worm groove 33 and the grooves 41, 41. For example, if the pitch of the grooves 41 were steeper than the pitch of the grooves 33, the rotational and axial movement of the sleeve member 26 would drive the shaft 12 at a faster rate than the rate of rotation of the input shaft 11.

While the pin-type followers 42 are illustrated to be pins, any projecting type followers, such as a steel ball, which are capable of moving in a groove of changing pitch without binding, could be used to replace the pins for movement in the grooves 41. Therefore, the term pin-type follower is used to include pins, projections or balls, although a pin is the preferred follower.

It will be understood that various modifications may be suggested by the embodiment disclosed but I wish to claim within the scope of the patent warranted hereon all such modifications and variations that come within the scope of my contribution to the art.

I claim as my invention:

1. A transmission means comprising a housing having a cavity, a shaft journalled in said housing for rotation with an end extending into said cavity, a sleeve member disposed in said cavity of said housing and telescopically disposed on the end of said shaft, means for rotating said sleeve in said housing, first cam means including a helical groove and a follower disposed between said sleeve member and said housing so that rotation of said sleeve member causes relative axial movement of said sleeve in said housing, second cam means including a helical groove of different pitch than the groove of said first cam means and a follower disposed between said sleeve and said end of said shaft so that the rotational movement of said sleeve is transferred to said shaft, at least one of said followers being a pin-type follower, and the ratio of rotation of said sleeve means and said shaft being dependent upon the difference in the pitch of the grooves of said first and second cam means.

2. A transmission means according to claim 1 wherein one of said helical grooves of said first and said second cam means is a helical groove of a changing pitch so that the ratio of rotation between said sleeve member and said shaft varies in response ot the angle of rotation.

3. A transmission means according to claim 1, wherein the helical groove of said first cam means is provided on the outer surface of the sleeve member and said follower of said first means is disposed in said housing, and wherein the helical groove of said second means is provided on an outer surface of said shaft and said follower of said second cam means is a pin mounted on an inner surface of said sleeve member.

4. A transmission means according to claim 3, wherein said means for rotating said sleeve member comprises an input shaft rotatably journalled in said housing with an end telescopically disposed in a portion of said sleeve member, and a key means extending between said input shaft and said sleeve member to impart rotation therebetween while enabling relative axial movement therebetween.

5. A transmission means according to claim 4 wherein said key means includes an axially extending groove on the end of said input shaft and an axially extending groove on an inner surface of said sleeve member with a ball engaging both grooves, and resilient means biasing the ball toward a center position in the groove of the input shaft.

6. A transmission device adapted to provide a ratio between an input and an output shaft of the steering system comprising a housing having a cavity, an input shaft rotatably journalled in said housing with an end extending into said cavity, an output shaft rotatably journalled in said housing in axial alignment with said input shaft and having an end extending into the cavity, a sleeve member disposed in said cavity telescopically receiving a portion of each of said ends of said input and output shafts, key means extending between said sleeve member and said input shaft for transferring rotation and enabling relative axial movement therebetween, a first cam means including a helical groove and a cam follower between said housing and said sleeve member so that rotation of said sleeve member by said input shaft causes relative axial movement of said sleeve with respect to said input shaft of said housing, and second cam means including a helical groove and a cam follower between said sleeve member and said output shaft so that movement of said sleeve member rotates said output shaft, one of said cam followers being a pin-type follower adapted to follow a helical groove of a varying pitch, whereby the ratio of rotation between said input and output shafts depends upon the relation of each of the grooves of said first and said second cam means.

7. A transmission according to claim 6, wherein the pitch of the helical groove coacting with said pin-type follower varies from a center position symmetrically towards each end of the groove so that as the input shaft is rotated to various angles of rotation from a center position the ratio between the rotation of the input and output shafts changes as the angle of rotation from a center position increases.

8. A transmission according to claim 7, wherein the follower of the first cam means is a pin follower rotatably mounted for rotation on its axis in a hollow boss of the wall of the housing and coactable with the helical groove formed in an outer surface of the sleeve member.

9. A transmission device according to claim 8 wherein a helical groove of the second cam means is formed on the end of the output shaft and the follower is a pin mounted on the inner surface of said sleeve member.

10. A transmission coupling comprising an input shaft, an output shaft, a sleeve embracing said shafts, means accommodating axial shifting of the sleeve coupling the input shaft and the sleeve for co-rotation, first means translating rotation of the sleeve into axial movement of the sleeve, second means translating axial movement of the sleeve into rotation of the output shaft, and one of said first and second means being a pin and variable pitched helical groove connection to vary the driving ratio between the shafts.

References Cited
UNITED STATES PATENTS

| | | | |
|---|---|---|---|
| 923,583 | 6/1909 | Ross | 74—499X |
| 1,185,721 | 6/1916 | Ross | 74—499 |
| 3,422,698 | 1/1969 | Folkerts | 74—497 |

MILTON KAUFMAN, Primary Examiner

U.S. Cl. X.R.

74—89.14, 96; 280—96